(12) United States Patent
Vash et al.

(10) Patent No.: US 8,443,148 B2
(45) Date of Patent: May 14, 2013

(54) SYSTEM-WIDE QUIESCENCE AND PER-THREAD TRANSACTION FENCE IN A DISTRIBUTED CACHING AGENT

(75) Inventors: James R. Vash, Littleton, MA (US); Bongjin Jung, Westford, MA (US); Rishan Tan, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 326 days.

(21) Appl. No.: 12/978,588

(22) Filed: Dec. 26, 2010

(65) Prior Publication Data

US 2011/0191542 A1 Aug. 4, 2011

Related U.S. Application Data

(60) Provisional application No. 61/290,204, filed on Dec. 26, 2009.

(51) Int. Cl.
*G06F 13/12* (2006.01)

(52) U.S. Cl.
USPC ............... 711/130; 711/120; 711/E12.039; 711/E12.038

(58) Field of Classification Search ............ 711/120, 711/130
See application file for complete search history.

(56) References Cited

U.S. PATENT DOCUMENTS

| | | | |
|---|---|---|---|
| 2007/0192827 A1* | 8/2007 | Maxted et al. | 726/1 |
| 2009/0199210 A1* | 8/2009 | Smith, Jr. | 719/315 |
| 2009/0276430 A1* | 11/2009 | Bruso et al. | 707/8 |

* cited by examiner

*Primary Examiner* — Kenneth Lo
(74) *Attorney, Agent, or Firm* — Caven & Aghevli LLC

(57) ABSTRACT

Methods and apparatus relating to system-wide quiescence and per-thread transaction fence in a distributed caching agent are described. Some embodiments utilize messages, counters, and/or state machines that support system-wide quiescence and per-thread transaction fence flows. Other embodiments are also disclosed.

20 Claims, 8 Drawing Sheets

SYSTEM-WIDE QUIESCENCE AND PER-THREAD TRANSACTION FENCE IN A DISTRIBUTED CACHING AGENT

RELATED APPLICATION

The present application relates to and claims priority from U.S. Provisional Patent Application No. 61/290,204, filed on Dec. 26, 2009, entitled "SYSTEM-WIDE QUIESCENCE AND PER-THREAD TRANSACTION FENCE IN A DISTRIBUTED CACHING AGENT" which is hereby incorporated herein by reference in its entirety and for all purposes.

FIELD

The present disclosure generally relates to the field of electronics. More particularly, an embodiment of the invention relates to system-wide quiescence and per-thread transaction fence in a distributed caching agent.

BACKGROUND

Recent processor designs include multiple cores on a single chip. Multiple cores may share caching resources on the chip, and in order to efficiently connect the multiple cores and a shared cache, a distributed cache may be implemented, connected by a shared interconnect. A distributed cache presents unique challenges in handling certain functions required in a processor, such as quiescence and fences.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Some embodiments discussed herein may implement system-wide quiescence and per-thread transaction fence in a distributed caching agent. The caching agent may service multiple processor cores integrated on a single die, in an embodiment. Generally, when the caching agent is implemented in a distributed fashion (e.g., composed of multiple copies of a cache controller (such as an LLC (Last Level Cache) controller), and communicates with the cores via a shared interconnect (e.g., a ring or bus), current methods sufficient for a centralized agent do not work or scale poorly.

As will be further discussed below, some embodiments utilize messages, counters, and/or state machines that support system-wide quiescence and per-thread transaction fence flows. These techniques scale well with the number of cores and LLC cache controllers.

Figure 1:
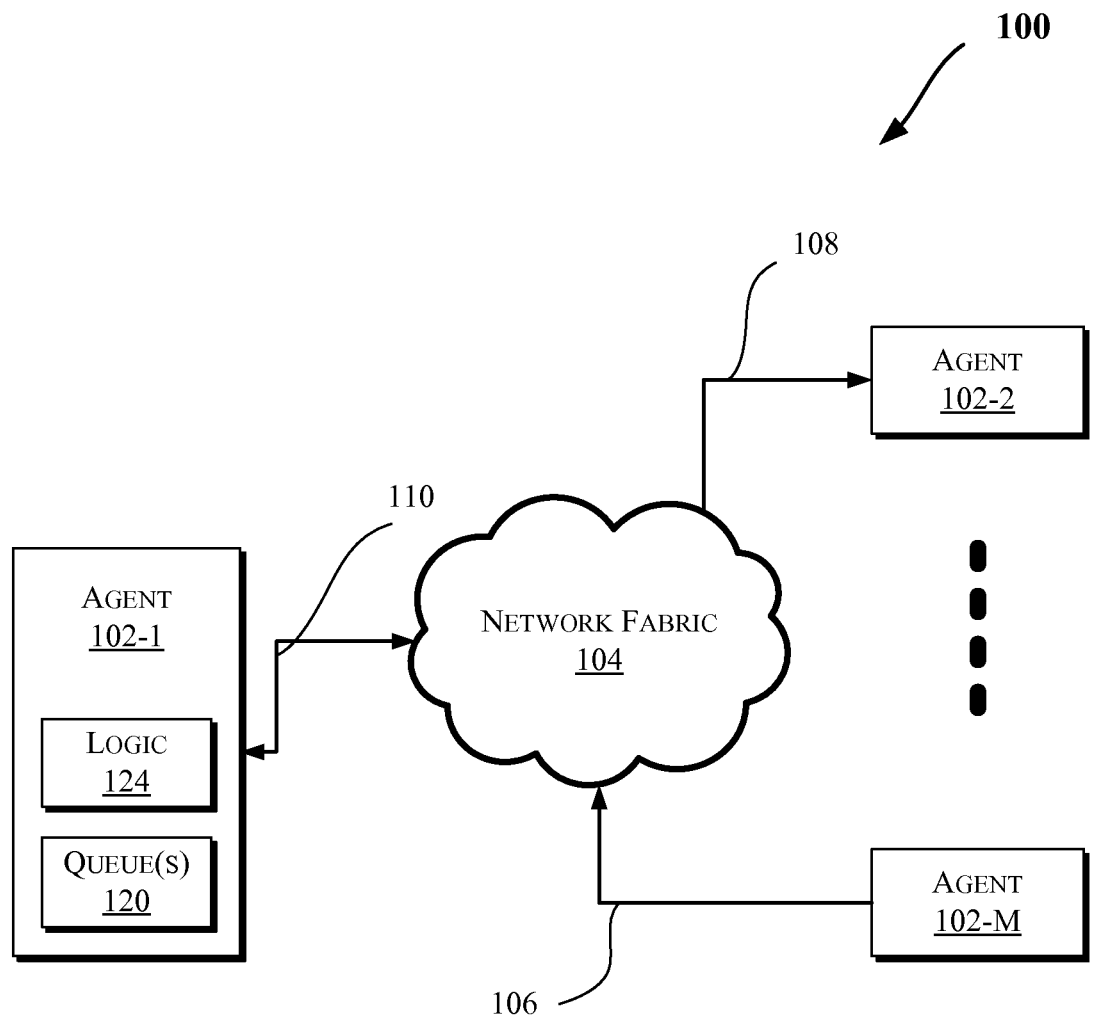
FIGS. 1-2 and 7-8 illustrate block diagrams of embodiments of computing systems, which may be utilized to implement various embodiments discussed herein.

Various computing systems may be used to implement embodiments, discussed herein, such as the systems discussed with reference to FIGS. 1-2 and 7-8. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, one or more of the agents 102 may be any of components of a computing system, such as the computing systems discussed with reference to FIGS. 7-8.

As illustrated in FIG. 1, the agents 102 may communicate via a network fabric 104. In one embodiment, the network fabric 104 may include a computer network that allows various agents (such as computing devices) to communicate data. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Additionally, at least one of the agents 102 may be a home agent and one or more of the agents 102 may be requesting or caching agents as will be further discussed herein. Further, agent 102-1 may include logic 124 to perform operation(s) associated with system-wide quiescence and per-thread transaction fence in a distributed caching agent, e.g., where data associated with the caching agent is stored in one or more queues 120 as will be discussed below, e.g., with reference to FIGS. 3-6. In an embodiment the queues 120 may be register files dedicated to the agent (or shared with other agents) to store one or more transactions, requests, responses, messages, etc., as will be discussed further below. In one embodiment, the queue(s) 120 are provided on the same integrated circuit (IC) chip as a caching agent.

Figure 2:
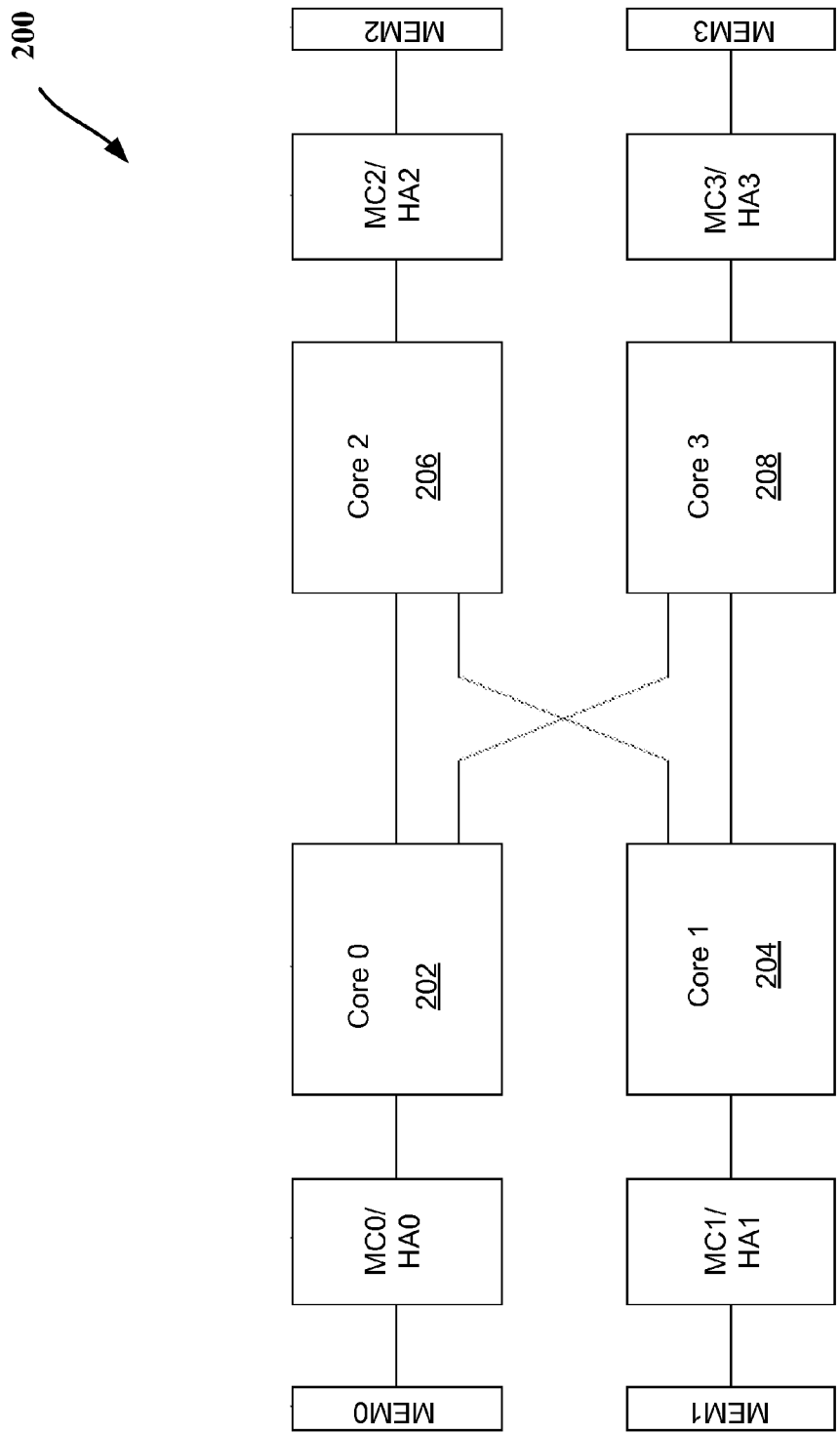

FIG. 2 is a block diagram of a computing system in accordance with an embodiment. System 200 may include a plurality of sockets 202-208 (four shown but some embodiments may have more or fewer sockets). Each socket may include a processor in an embodiment. Also, each socket may be coupled to the other sockets via point-to-point (PtP) link such as discussed with reference FIG. 5. As discussed with respect to FIG. 1 with reference to the network fabric 104, each socket may be coupled to a local portion of system memory, e.g., formed of a plurality of Dual Inline Memory Modules (DIMMs) that may include dynamic random access memory (DRAM).

As shown in FIG. 2, each socket may be coupled to a memory controller (MC)/Home Agent (HA) (such as MC0/HA0 through MC3/HA3). The memory controllers may be coupled to a corresponding local memory (labeled as MEM0 through MEM3), which may be a portion of system memory (such as memory 512 of FIG. 5). In some embodiments, the memory controller (MC)/Home Agent (HA) (such as MC0/HA0 through MC3/HA3) may be the same or similar to agent 102-1 of FIG. 1 and the memory, labeled as MEM0 through MEM3. Also, in one embodiment, MEM0 through MEM3 may be configured to mirror data, e.g., as master and slave. Also, one or more components of system 200 may be included on the same integrated circuit die in some embodiments. An implementation such as shown in FIG. 2 thus may be for a socket glueless configuration with mirroring. For example, data assigned to a memory controller (such as MC0/HA0) may be mirrored to another memory controller (such as MC3/HA3) over the PtP links.

Some interconnects (such as Intel® QPI (Quick Path Interconnect)) use a protocol that supports several operations (including for example Lock, SplitLock, Quiesce) that require system-wide quiescence, to support uncacheable or split cache line atomic operations, or certain RAS (reliability, availability, and serviceability) and reconfiguration flows. Generally, a SplitLock refers to an operation that is performed preceding a lock operation that crosses a cache line boundary (e.g., a lock split between two cache lines). These operations may require each protocol agent (e.g., caching agent) to stop generating new requests and indicate when all prior outstanding requests are complete. As discussed herein, the use of term QPI is intended to refer to any type of an point-to-point processor interconnect such as those discussed herein with reference to FIG. 1-2 or 7-8.

Some processors may include cores that require support of a per-thread fence operation. This operation generally requires the local caching agent to indicate when all prior outstanding requests (e.g., and all cache victims created as a side effect) are complete for the requested thread.

Figure 7:
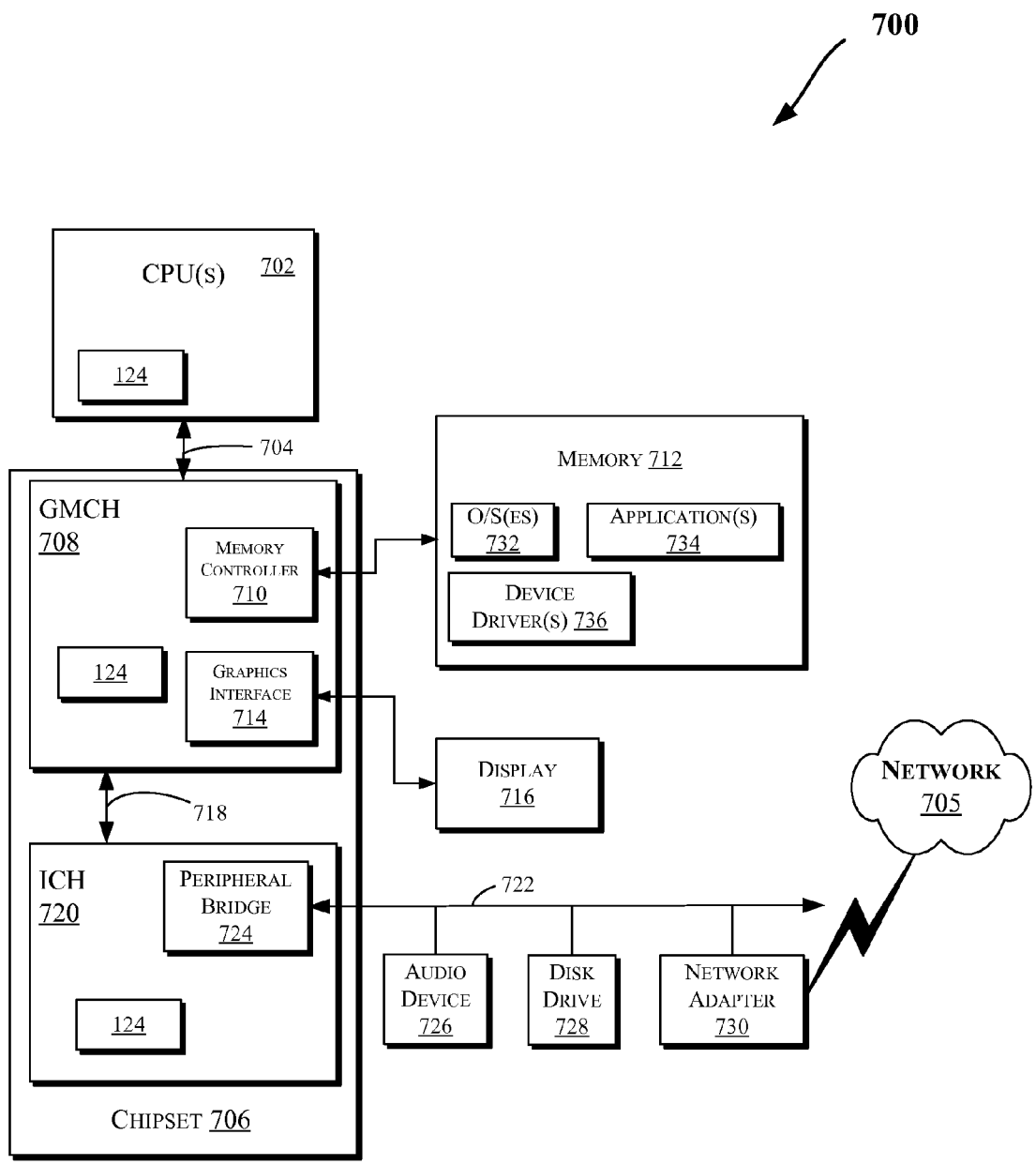
Figure 8:
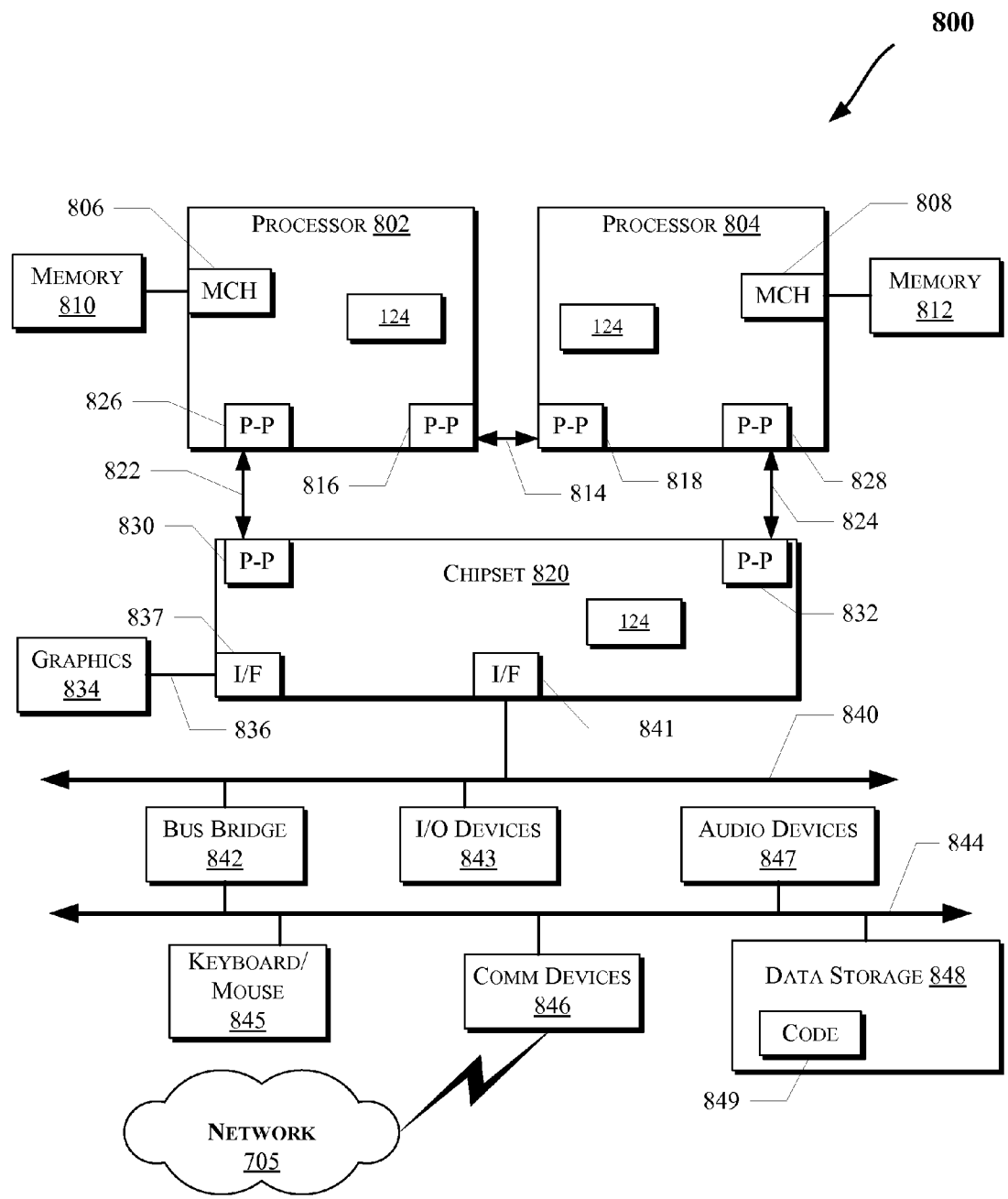

Furthermore, some processors include multiple cores and multiple levels of cache integrated on a single die (such as discussed herein with reference to FIG. 1 or 7-8). For example, some Xeon® processors (available from Intel® Corporation) have eight cores which share a 24 MB LLC (last level cache). There may be multiple instances (e.g., 8 instances) of an LLC cache controller, each responsible for servicing requests for a slice of the LLC (e.g., a 3 MB slice). The cores, LLC cache controllers, and system interface may be coupled by a shared (e.g., ring) interconnect.

Figure 3:
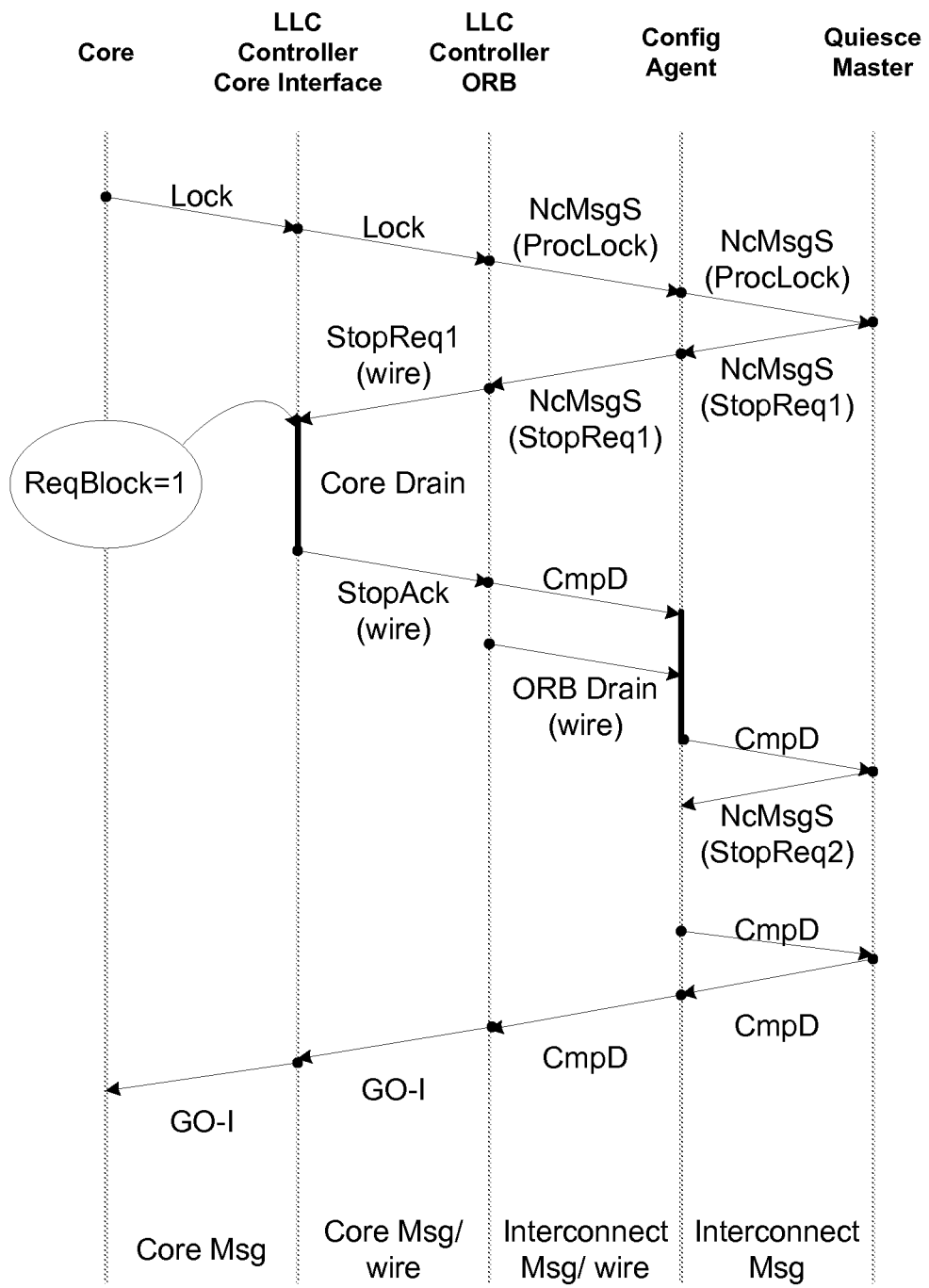
FIGS. 3-4 illustrate flow diagrams in accordance with some embodiments.

FIG. 3 illustrates a lock flow according to an embodiment. The lock flow begins when a core sends a Lock, SplitLock, or Quiesce request to the local caching agent. These requests may be handled by the co-located LLC cache controller. The protocol used to communicate between the core and caching agent may guarantee that when one of these requests is sent, there are no outstanding transactions from that core. It may also guarantee that until a response is received, no further requests will be made from that core. For example, a flag may be set in the cache controller to indicate that the corresponding core has a lock flow request outstanding. In an embodiment, the designation of "wire" in the figures is intended to refer to direct (e.g., sideband) signals exchanged between agents in the system.

In some embodiments, when the request is accepted by the LLC cache controller ORB (outstanding request buffer), it is sent to the local socket configuration agent, and a flag is set to indicate that this ORB has a lock flow request outstanding. The configuration agent may choose fairly among lock flow requests from each core, and sends a request to the Quiesce Master, which may be an IOH (Input/Output Hub) in an embodiment. As discussed herein, "NcMsgS" is intended to refer to a non-coherent message Standard (e.g., non-posted message as opposed to a bypass or posted message). Also, "ProcLock" is intended to refer to a processor lock.

In an embodiment, the Quiesce Master chooses fairly among lock flow requests from each configuration agent in the system, and sends a StopReq1 message to each socket's configuration agent. The configuration agent in turn sends it to each LLC cache controller within the socket. When an LLC cache controller receives this message, it blocks new requests from being made by the co-located core (unless that core has a lock flow request outstanding), and waits for all prior outstanding requests (and cache victims created as a side effect) to complete.

To track prior outstanding requests and associated cache victims, each LLC cache controller may maintain two counters for each thread on behalf of the co-located core. The first, called the "ORC" (outstanding response counter), tracks the number of responses expected to be received for outstanding requests. The second, called the "vORC" (victim outstanding response counter), tracks the number of responses expected to be received for cache victims created as a side effect of requests made by this core.

The ORCs and vORCs may use core requests (such as Read, Read0, or Write) and response (Data, GO, WritePull) messages, plus two additional messages. One message may be an LLCMiss response. In an embodiment, this response is generated when a cacheable core Read or Read0 request misses the LLC, and therefore creates a cache victim as a side effect. This may be used in the core for performance monitoring purposes, but is used in this case to track the generation of cache victims created as a side effect of requests made by this core, in accordance with one embodiment. The other response may be an LLCCmp response. This response is generated when a cache victim completes. It may not be sent to the core, but may be used in this case to track the completion of cache victims created as a side effect of requests made by this core.

In accordance with some embodiments, the rules for increment and decrement of the ORC are: (1) Send core Read request: increment by three. Expect two 32B Data responses and one GO (global observation) response. (2) Send core Read0 request: increment by one. Expect one GO response. (3) Send core Write request: increment by two. Expect one WritePull response and one GO response. (4) Receive 32B Data response: decrement by one. (5) Receive GO response: decrement by one. (6) Receive WritePull response: decrement by one. However, embodiments discussed herein are not limited to specific increment/decrement values.

In accordance with some embodiments, the rules for increment and decrement of the vORC are: (1) Send {LLCWBInv, LLCInv, LLCExpose} request: increment by one. Expect one LLCCmp response. GO responses are sent early for these requests, and a cache victim is generated implicitly without an LLCMiss response. (2) Receive LLCMiss response: increment by one. Expect one LLCCmp response. (3) Receive LLCCmp response: decrement by one.

In an embodiment, Data, GO, WritePull, and LLCMiss responses use their core request buffer identifier to look up the thread of the corresponding request in a bit vector that indicates, for each core request buffer entry, which thread made the request. LLCCmp responses use a reserved core request buffer identifier, one for each thread, since those responses maybe received after the corresponding core request buffer has been deallocated and reused, potentially by another thread.

In one embodiment, within the LLC cache controller, when a cache victim is generated, the associated requesting core and thread are maintained along with the victim, in order to send the LLCCmp message to the proper target, and with the proper reserved core request buffer identifier, upon completion.

In an embodiment, when a StopReq1 is received, prior outstanding requests and associated cache victims for the co-located core are completed when both of the following are true: (1) ORCs for each thread are zero, or the core has an outstanding lock flow request. (2) vORCs for each thread are zero.

In some embodiments, the ORCs and vORCs are kept as separate counters because LLCMiss and LLCCmp responses may be reordered on the ring interconnect. If a single counter was kept per thread, then for core Read0 requests that create a cache victim, the counter could go to zero when an LLCCmp response was received before either LLCMiss or GO response. This would falsely indicate that prior outstanding requests and cache victims have completed. A vORC may become zero (or underflow) temporarily when there are still outstanding cache victims, but since LLCMiss and GO responses are ordered, it is generally not possible for this to happen when the corresponding ORC is zero.

Once the prior outstanding requests and associated cache victims are completed for a core, the co-located LLC cache controller sends a CmpD (Completion with Data) response to the local configuration agent. A flag may be set in the ORB to indicate that a StopReq 1 has been completed, and the ORB starts preventing PrefetchHint (DCA—direct cache access) external requests from generating prefetches. This may be done in some implementations if the LLC cache controller (as opposed to the core) is responsible for generating prefetches based on PrefetchHint.

When the local configuration agent receives CmpD responses from all LLC cache controllers, it checks a global signal that indicates that the ORB has drained for all LLC cache controllers. One reason this is done is that, even after all core requests and associated cache victims are complete, there may be several types of transactions still active in the ORB. In an embodiment, the first type is a transaction which is in the interconnect coherence protocol conflict phase. At this point, all responses have been sent to the core, but the transaction may still be outstanding on the interconnect to resolve a conflict with other requesters. The second type may be a prefetch transaction generated by a PrefetchHint. There may not be any core request associated with this transaction.

To track whether the ORB is drained, each LLC cache controller may maintain a count of valid ORB entries allocated by core requests and cache victims. In an embodiment, ORB entries allocated by the interconnect snoops are not counted, as their progress is tracked by the requester on whose behalf the snoop was sent.

In an embodiment, the ORB is drained when: (1) The count of valid ORB entries allocated by cache victims is zero. (2) The count of valid ORB entries allocated by core requests is zero, or the ORB has an outstanding lock flow request and the count of valid ORB entries allocated by core requests is one. In accordance with one embodiment, the reason that a separate global signal is used to transmit this information to the configuration agent, rather than being used as a condition for sending the CmpD message from the LLC cache controller, is because at the time a core's prior requests and associated cache victims are completed, it is possible for the co-located LLC cache controller's ORB to be drained, but for other cores' requests to be in flight to that LLC cache controller.

Once the configuration agent determines that all ORBs are drained, it sends a CmpD response to the Quiesce Master. The Quiesce Master proceeds to send StopReq2 messages. In an embodiment, this message is simply completed by the configuration agent, as it may be required in the flow for other IOH agents, not for CPU agents. Then, the Quiesce Master sends a CmpD for the original request. This is returned via the local configuration agent to the LLC cache controller ORB, and a GO response is sent in turn to the co-located core. When the ORB entry for the lock flow request is deallocated, the flag that was set to indicate that this ORB has a lock flow request outstanding may also be cleared. At this point, the requesting core has exclusive access to the system.

Figure 4:
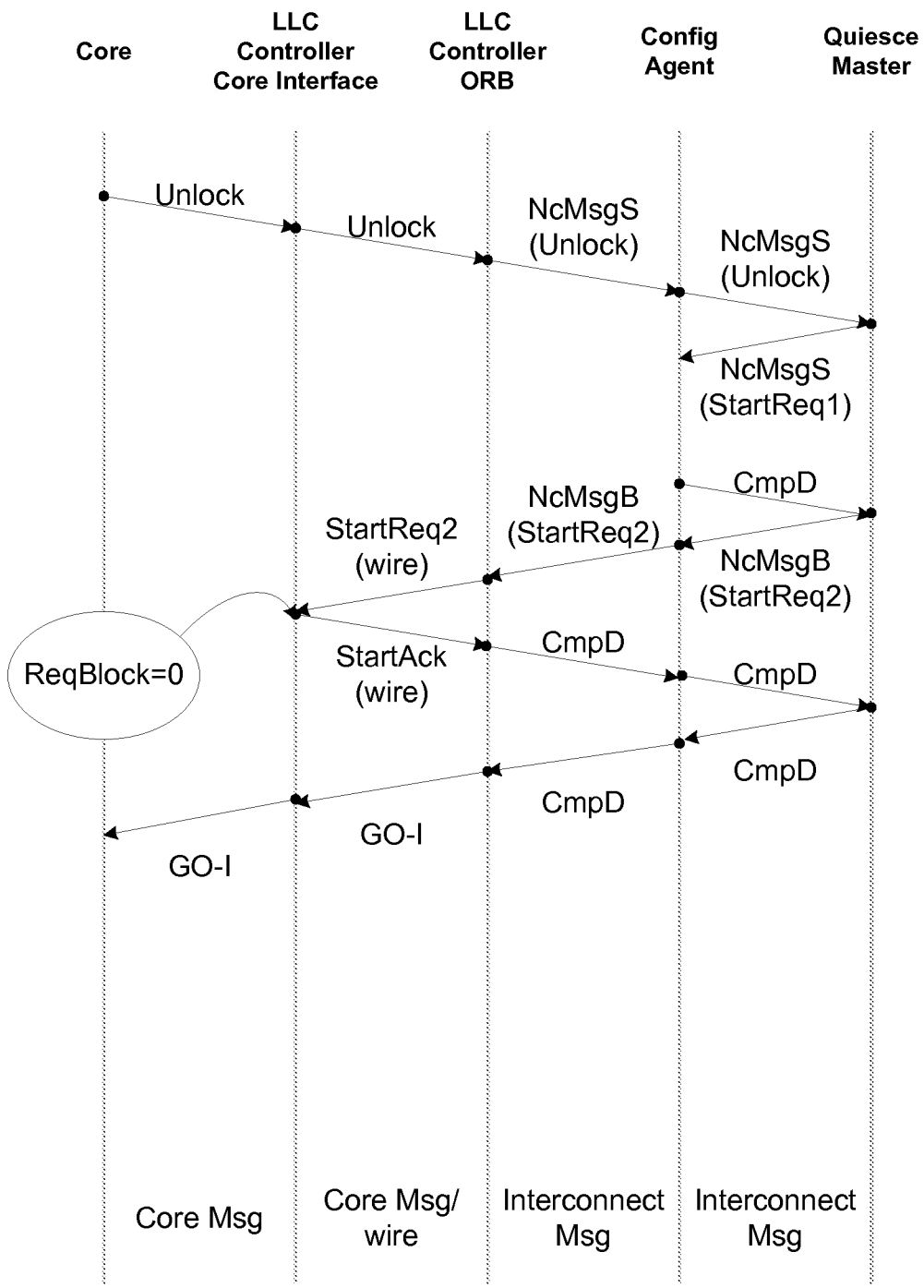

In one embodiment, after the core completes the atomic operation or other flow requiring system quiescence, it sends an Unlock request to the co-located LLC cache controller. FIG. 4 illustrates an unlock flow accordingly to an embodiment. As mentioned above, it may be guaranteed that when the request is sent, there are no outstanding transactions from that core, and until a response is received, no further requests will be made from that core. The flag that was set in the cache controller to indicate that this core has a lock flow request outstanding is also cleared. Even though some embodiments indicating setting a flag or bit, it is of course possible to reverse the setting and clearing depending on the implementation to indicate various conditions.

When the request is accepted by the LLC cache controller ORB, the request may be sent to the local socket configuration agent. The configuration agent forwards the request to the Quiesce Master. The Quiesce Master proceeds to send StartReq1 messages. This message may be simply completed by the configuration agent, as it may be required in the flow for other IOH agents, not for CPU agents.

As shown in FIG. 4, the Quiesce Master sends a StartReq2 message to each socket's configuration agent. The configuration agent in turn sends it to each LLC cache controller. When the LLC cache controller receives this message, it unblocks new requests from being made by the co-located core. The co-located LLC cache controller (immediately) sends a CmpD response to the local configuration agent. The flag that was set in the ORB to indicate that a StopReq1 has been completed may also be cleared, and the ORB stops preventing PrefetchHint (DCA—direct cache access) external requests from generating prefetches.

When the local configuration agent receives CmpD responses from all LLC cache controllers, it sends a CmpD response to the Quiesce Master. Then, the Quiesce Master sends a CmpD for the original request. This may be returned via the local configuration agent to the LLC cache controller ORB, and a GO response is sent in turn to the co-located core. When the local configuration agent sees the CmpD for the Unlock, it is able to send a new lock flow request to the Quiesce Master.

Figure 5:
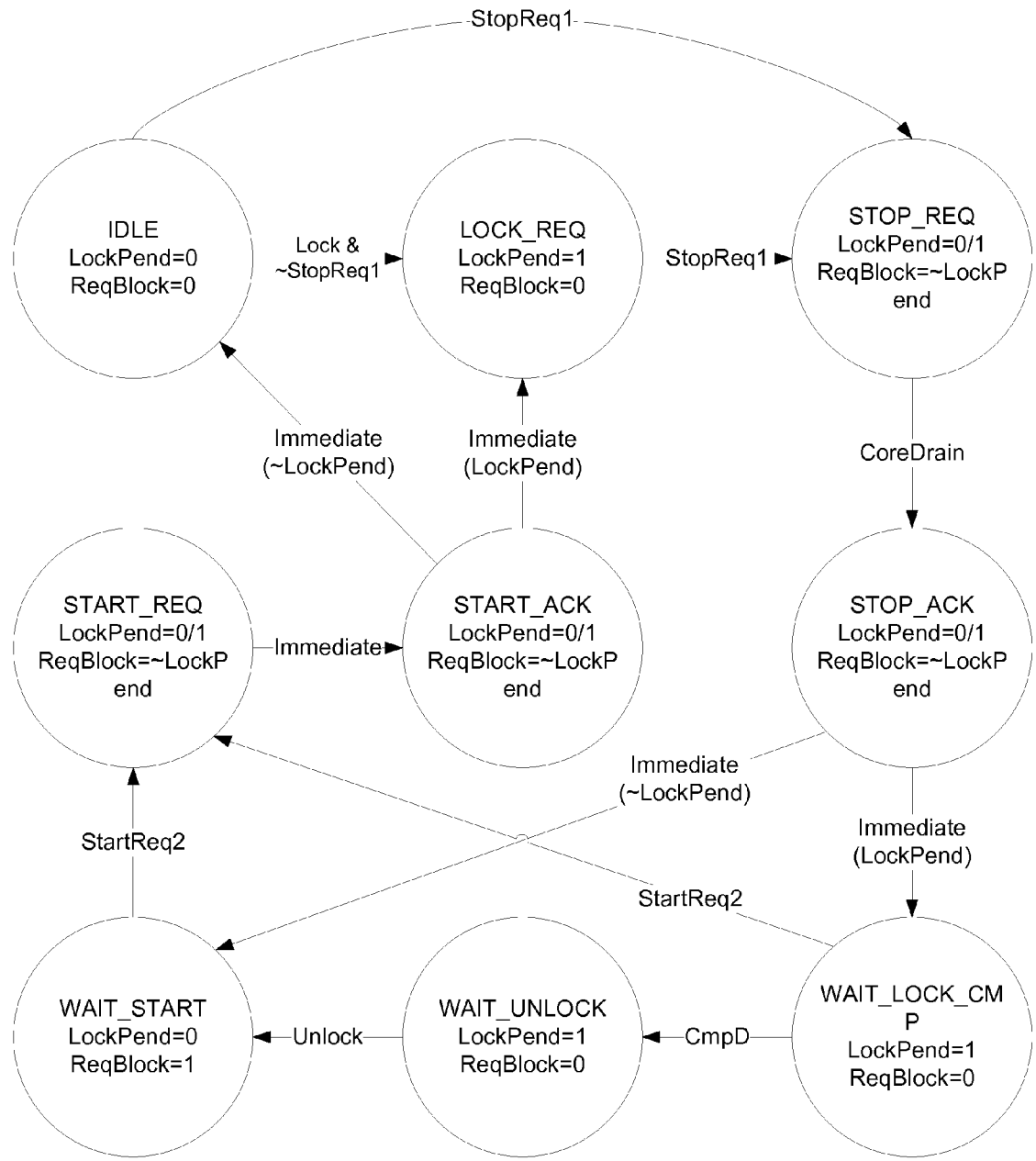
FIGS. 5-6 illustrate state machines in accordance with some embodiments.

FIG. 5 illustrates a state machine associated with lock flow requests, according to an embodiment. LockPend is the flag set in the cache controller to indicate that the co-located core has a lock flow request outstanding. ReqBlock indicates when the LLC cache controller blocks new requests from being made by the co-located core.

In some embodiments, from IDLE state, Lock and StopReq1 (for another core's Lock) may occur simultaneously. In this case, the state machine moves (immediately) to the STOP_REQ state. STOP_REQ, STOP_ACK, WAIT_START, START_REQ, and START_ACK states may be visited independently of whether LockPend is set. Whether ReqBlock is set in these states depends on whether LockPend is clear. LOCK REQ, WAIT_LOCK_CMP, and WAIT_UNLOCK states may be visited only when LockPend is set in an embodiment.

In an embodiment, only in WAIT_UNLOCK state, is it guaranteed that the local core's lock flow request is the "winner" (i.e., is the one currently being serviced by the Quiesce Master). LockPend may be cleared when Unlock occurs. This causes ReqBlock to assert, which is not strictly necessary, but is harmless, as the subsequent StartReq2 will cause ReqBlock to deassert. This occurs before the core receives a GO response for Unlock and is able to make any new requests. One key arc of the state machine is the "CoreDrain" arc from STOP_REQ to STOP_ACK state. This determination is made using the ORCs, vORCs, and LockPend.

Figure 6:
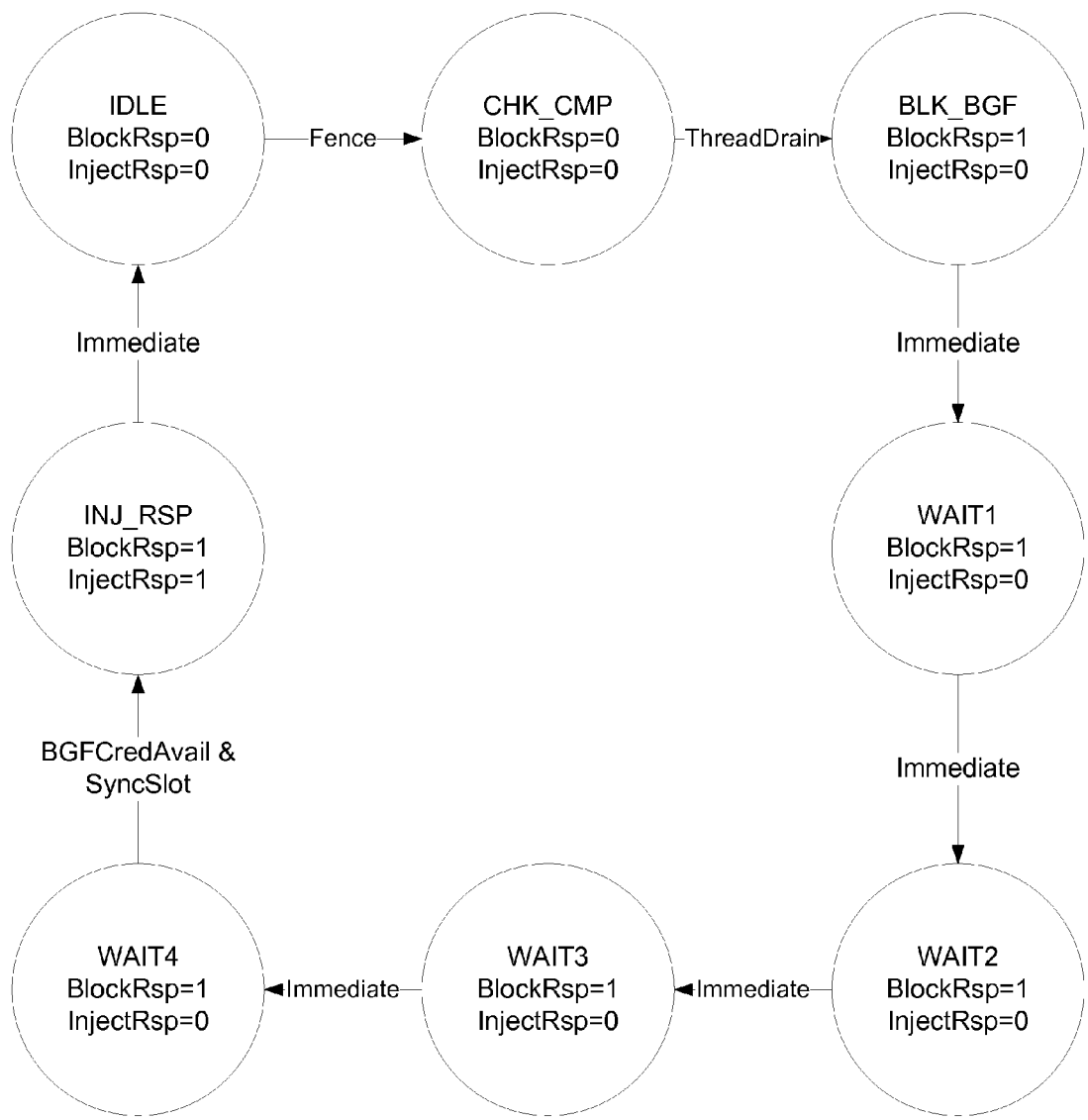

FIG. 6 illustrates a state machine associated with fence requests according to an embodiment. BlockRsp indicates when the state machine is blocking responses targeting the co-located core. InjectRsp indicates when a GO response is injected for the fence. SyncSlot is the toggling bit that ensures GO responses injected for a fence on both threads do not collide. One key arc of the state machine is the "ThreadDrain" arc from CHK_CMP to BLK_BGF state. This determination is made using the vORCs.

With respect to per-thread transaction fence, the core protocol fence flow may leverage the per-thread ORC and vORC counters. Similar to a lock flow request, a fence may be handled by the co-located LLC cache controller. The core protocol may guarantee that when a fence is sent, there are no outstanding transactions from that thread. It also may guarantee that until a response is received, no further requests will be made from that thread.

In one embodiment, a fence is entirely processed by a per-thread state machine. It is not allocated into the LLC cache controller ORB. When a fence is received, it begins checking the vORC for that thread (the ORC is zero, since there are no outstanding transactions). When the vORC becomes zero, cache victims associated with requests from that thread have drained.

Once the vORC becomes zero, the state machine starts to block responses targeting the co-located core. After a delay to let in-flight responses drain, a GO response may be injected for the fence when BGF (bubble generator clock-crossing FIFO (First-In, First-Out)) credits are available. A toggling bit may ensure that GO responses injected for a fence on both threads do not collide. Each thread's state machine is presented with opposite versions of the toggling bit to allow GO response injection.

FIG. 7 illustrates a block diagram of an embodiment of a computing system 700. One or more of the agents 102 of FIG. 1 may comprise one or more components of the computing system 700. Also, one or more components of FIG. 7 may include logic 124 of FIG. 1. Also, logic 124 may be present in components other than those shown. The computing system 700 may include one or more central processing unit(s) (CPUs) 702 (which may be collectively referred to herein as "processors 702" or more generically "processor 702") coupled to an interconnection network (or bus) 704. The processors 702 may be any type of processor such as a general purpose processor, a network processor (which may process data communicated over a computer network 705), etc. (including a reduced instruction set computer (RISC) processor or a complex instruction set computer (CISC)). Moreover, the processors 702 may have a single or multiple core design. The processors 702 with a multiple core design may integrate different types of processor cores on the same integrated circuit (IC) die. Also, the processors 702 with a multiple core design may be implemented as symmetrical or asymmetrical multiprocessors.

The processor 702 may include one or more caches which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 700. Additionally, such cache(s) may be located in various locations (e.g., inside other components to the computing systems discussed herein.

A chipset 706 may additionally be coupled to the interconnection network 704. Further, the chipset 706 may include a graphics memory control hub (GMCH) 708. The GMCH 708 may include a memory controller 710 that is coupled to a memory 712. The memory 712 may store data, e.g., including sequences of instructions that are executed by the processor 702, or any other device in communication with components of the computing system 700. Also, in one embodiment of the invention, the memory 712 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 704, such as multiple processors and/or multiple system memories.

The GMCH 708 may further include a graphics interface 714 coupled to a display device 716 (e.g., via a graphics accelerator in an embodiment). In one embodiment, the graphics interface 714 may be coupled to the display device 716 via an accelerated graphics port (AGP). In an embodiment of the invention, the display device 716 (such as a flat panel display) may be coupled to the graphics interface 714 through, for example, a signal converter that translates a digital representation of an image stored in a storage device such as video memory or system memory (e.g., memory 712) into display signals that are interpreted and displayed by the display 716.

As shown in FIG. 7, a hub interface 718 may couple the GMCH 708 to an input/output control hub (ICH) 720. The ICH 720 may provide an interface to input/output (I/O) devices coupled to the computing system 700. The ICH 720 may be coupled to a bus 722 through a peripheral bridge (or controller) 724, such as a peripheral component interconnect (PCI) bridge that may be compliant with the PCIe specification, a universal serial bus (USB) controller, etc. The bridge 724 may provide a data path between the processor 702 and peripheral devices. Other types of topologies may be utilized. Also, multiple buses may be coupled to the ICH 720, e.g., through multiple bridges or controllers. Further, the bus 722 may comprise other types and configurations of bus systems. Moreover, other peripherals coupled to the ICH 720 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 722 may be coupled to an audio device 726, one or more disk drive(s) 728, and a network adapter 730 (which may be a NIC in an embodiment). In one embodiment, the network adapter 730 or other devices coupled to the bus 722 may communicate with the chipset 706. Also, various components (such as the network adapter 730) may be coupled to the GMCH 708 in some embodiments of the invention. In addition, the processor 702 and the GMCH 708 may be combined to form a single chip. In an embodiment, the memory controller 710 may be provided in one or more of the CPUs 702. Further, in an embodiment, GMCH 708 and ICH 720 may be combined into a Peripheral Control Hub (PCH).

Additionally, the computing system 700 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 728), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 712 may include one or more of the following in an embodiment: an operating system (O/S) 732, application 734, and/or device driver 736. The memory 712 may also include regions dedicated to Memory Mapped I/O (MMIO) operations. Programs and/or data stored in the memory 712 may be swapped into the disk drive 728 as part of memory management operations. The application(s) 734 may execute (e.g., on the processor(s) 702) to communicate one or more packets with one or more computing devices coupled to the network 705. In an embodiment, a packet may be a sequence of one or more symbols and/or values that may be encoded by one or more electrical signals transmitted from at least one sender to at least on receiver (e.g., over a network such as the network 705). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 705).

In an embodiment, the application 734 may utilize the O/S 732 to communicate with various components of the system 700, e.g., through the device driver 736. Hence, the device driver 736 may include network adapter 730 specific commands to provide a communication interface between the O/S 732 and the network adapter 730, or other I/O devices coupled to the system 700, e.g., via the chipset 706.

In an embodiment, the O/S 732 may include a network protocol stack. A protocol stack generally refers to a set of procedures or programs that may be executed to process packets sent over a network 705, where the packets may conform to a specified protocol. For example, TCP/IP (Transport Control Protocol/Internet Protocol) packets may be processed using a TCP/IP stack. The device driver 736 may indicate the buffers in the memory 712 that are to be processed, e.g., via the protocol stack.

The network 705 may include any type of computer network. The network adapter 730 may further include a direct memory access (DMA) engine, which writes packets to buffers (e.g., stored in the memory 712) assigned to available descriptors (e.g., stored in the memory 712) to transmit and/or receive data over the network 705. Additionally, the network adapter 730 may include a network adapter controller, which may include logic (such as one or more programmable processors) to perform adapter related operations. In an embodiment, the adapter controller may be a MAC (media access control) component. The network adapter 730 may further include a memory, such as any type of volatile/nonvolatile memory (e.g., including one or more cache(s) and/or other memory types discussed with reference to memory 712).

FIG. 8 illustrates a computing system 800 that is arranged in a point-to-point (PtP) configuration, according to an embodiment of the invention. In particular, FIG. 8 shows a system where processors, memory, and input/output devices are interconnected by a number of point-to-point interfaces. The operations discussed with reference to FIGS. 1-7 may be performed by one or more components of the system 800.

As illustrated in FIG. 8, the system 800 may include several processors, of which only two, processors 802 and 804 are shown for clarity. The processors 802 and 804 may each include a local memory controller hub (GMCH) 806 and 808 to enable communication with memories 810 and 812. The memories 810 and/or 812 may store various data such as those discussed with reference to the memory 812 of FIG. 8. As shown in FIG. 8, the processors 802 and 804 (or other components of system 800 such as chipset 820, I/O devices 843, etc.) may also include one or more cache(s) such as those discussed with reference to FIGS. 1-7.

In an embodiment, the processors 802 and 804 may be one of the processors 802 discussed with reference to FIG. 8. The processors 802 and 804 may exchange data via a point-to-point (PtP) interface 814 using PtP interface circuits 816 and 818, respectively. Also, the processors 802 and 804 may each exchange data with a chipset 820 via individual PtP interfaces 822 and 824 using point-to-point interface circuits 826, 828, 830, and 832. The chipset 820 may further exchange data with a high-performance graphics circuit 834 via a high-performance graphics interface 836, e.g., using a PtP interface circuit 837.

In at least one embodiment, logic 124 may be provided in one or more of the processors 802, 804 and/or chipset 820. Other embodiments of the invention, however, may exist in other circuits, logic units, or devices within the system 800 of FIG. 8. Furthermore, other embodiments of the invention may be distributed throughout several circuits, logic units, or devices illustrated in FIG. 8. However, logic 124 may be provided in locations throughout the system 800, including or excluding those illustrated.

The chipset 820 may communicate with the bus 840 using a PtP interface circuit 841. The bus 840 may have one or more devices that communicate with it, such as a bus bridge 842 and I/O devices 843. Via a bus 844, the bus bridge 842 may communicate with other devices such as a keyboard/mouse 845, communication devices 846 (such as modems, network interface devices, or other communication devices that may communicate with the computer network 805), audio I/O device, and/or a data storage device 848. The data storage device 848 may store code 849 that may be executed by the processors 802 and/or 804.

In various embodiments of the invention, the operations discussed herein, e.g., with reference to FIGS. 1-8, may be implemented as hardware (e.g., circuitry), software, firmware, microcode, or combinations thereof, which may be provided as a computer program product, e.g., including a (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein. Additionally, such computer-readable media may be downloaded as a computer program product, wherein the program may be transferred from a remote computer (e.g., a server) to a requesting computer (e.g., a client) through data signals provided via a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a distributed caching agent to service requests from a plurality of processor cores, wherein the caching agent is to comprise a plurality of cache controllers that are to communicate via a shared interconnect,
wherein the distributed caching agent is to provide a system-wide quiescence or a per-thread transaction fence capability based on one or more messages and values stored in a plurality of counters and in response to a request from a first processor core of the plurality of processor cores.

2. The apparatus of claim 1, wherein the distributed caching agent is to provide the system-wide quiescence based on one or more state machines that are to control a content of the one or more messages and the values stored in the plurality of counters.

3. The apparatus of claim 1, wherein the distributed caching agent is to indicate when all prior outstanding requests are complete for a requested thread to provide the per-thread transaction fence capability.

4. The apparatus of claim 1, wherein the distributed caching agent is to indicate when all cache victims created as a side effect are complete for a requested thread to provide the per-thread transaction fence capability.

5. The apparatus of claim 1, wherein the request from the first processor core is to correspond to one or more of: a lock request, a split lock request, a quiescence request, or a fence request.

6. The apparatus of claim 1, wherein after acceptance of the request, no further requests from the first processor core are to be accepted until completion of all prior outstanding requests.

7. The apparatus of claim 1, wherein the plurality of counters are to comprise a first counter to track a number of responses expected to be received for outstanding requests and a second counter track a number of responses expected to be received for cache victims created as a side effect of requests made by a thread of a requesting processor core.

8. The apparatus of claim 1, wherein after completion of the system-wide quiescence or the per-thread transaction fence, the first processor core is to send an unlock request to the distributed caching agent.

9. The apparatus of claim 1, wherein the plurality of cache controllers comprise a plurality of Last Level Cache (LLC) controllers.

10. The apparatus of claim 1, wherein the distributed caching agent, the plurality of the processor cores, and the shared interconnect are on a same integrated circuit die.

11. A method comprising:
receiving a request at a distributed caching agent from a first processor core of a plurality of processor cores;
communicating one or more messages between a plurality of cache controllers via a shared interconnect in response to the request; and
providing a system-wide quiescence or a per-thread transaction fence capability based on the one or more messages and values stored in a plurality of counters, and in response to the request.

12. The method of claim 11, further comprising providing the system-wide quiescence capability based on one or more state machines that are to control a content of the one or more messages and the values stored in the plurality of counters.

13. The method of claim 11, further comprising indicating when all prior outstanding requests are complete for a requested thread to provide the per-thread transaction fence capability.

14. The method of claim 11, further comprising indicating when all cache victims created as a side effect are complete for a requested thread to provide the per-thread transaction fence capability.

15. The method of claim 11, wherein the request from the first processor core is to correspond one or more of: a lock request, a split lock request, a quiescence request, or a fence request.

16. A system comprising:
a memory to store one or more instructions; and
a processor comprising a distributed caching agent to service a plurality of processor cores of the processor, wherein the caching agent is to comprise a plurality of cache controllers that are to communicate via a shared interconnect,
wherein the distributed caching agent is to provide system-wide quiescence or a per-thread transaction fence capability based on one or more messages and values stored in a plurality of counters and in response to a request from a first processor core of the plurality of processor cores.

17. The system of claim 16, wherein the distributed caching agent is to provide system-wide quiescence capability based on one or more state machines that are to control a content of the one or more messages and the values stored in the plurality of counters.

18. The system of claim 16, wherein the distributed caching agent is to indicate when all prior outstanding requests are complete for a requested thread to provide the per-thread transaction fence capability.

19. The system of claim 16, wherein the distributed caching agent is to indicate when all cache victims created as a side effect are complete for a requested thread to provide the per-thread transaction fence capability.

20. The system of claim 16, wherein the request from the first processor core is to correspond one or more of: a lock request, a split lock request, a quiescence request, or a fence request.

* * * * *